United States Patent [19]

Kennedy

[11] Patent Number: 5,073,976
[45] Date of Patent: Dec. 17, 1991

[54] SIGNAL-TO-NOISE RATIO INDICATING CIRCUIT FOR FM RECEIVERS

[75] Inventor: John F. Kennedy, Garden City, Mich.

[73] Assignee: Ford Motor Company, Dearborn, Mich.

[21] Appl. No.: 443,626

[22] Filed: Nov. 30, 1989

[51] Int. Cl.$^5$ ............................................. H04B 17/02
[52] U.S. Cl. ..................................... 455/161; 455/232
[58] Field of Search .............. 455/161, 164, 166, 135, 455/136, 150, 296, 297, 307, 222, 223, 232

[56] References Cited

U.S. PATENT DOCUMENTS

| | | | |
|---|---|---|---|
| 3,701,025 | 10/1972 | Foley | 455/161 |
| 3,821,649 | 6/1974 | Grosjean . | |
| 3,889,192 | 6/1975 | Schiebelhuth et al. . | |
| 3,984,776 | 10/1976 | Stedman . | |
| 4,038,604 | 7/1977 | Koerber . | |
| 4,063,179 | 12/1977 | Brown | 455/166 |
| 4,246,655 | 1/1981 | Parker | 455/135 |
| 4,262,363 | 4/1981 | Wiechmann et al. . | |
| 4,314,377 | 2/1982 | Kondo et al. . | |
| 4,480,335 | 10/1984 | Kishi | 455/219 |
| 4,538,300 | 8/1985 | Richards, Jr. . | |
| 4,580,285 | 4/1986 | Richards, Jr. . | |
| 4,723,303 | 2/1988 | Koch . | |
| 4,731,868 | 3/1988 | Dreier . | |
| 4,975,953 | 12/1990 | Kennedy et al. . | |
| 5,014,348 | 5/1991 | Boone et al. | 455/164 |

Primary Examiner—Reinhard J. Eisenzopf
Assistant Examiner—Lisa D. Charouel
Attorney, Agent, or Firm—Mark Mollon; Roger L. May

[57] ABSTRACT

An FM broadcast receiver includes apparatus for measuring signal quality. Signal-to-noise ratio in the received signal is determined by isolating a noise component of the received audio signal, multiplying the isolated noise component by a gain determined by received field intensity, and comparing peak amplified noise against a reference. The derived signal-to-noise ratio can be employed to stop an automatic scan tuning operation or can be employed to provide a display of received signal-to-noise ratio.

20 Claims, 3 Drawing Sheets

SIGNAL-TO-NOISE RATIO INDICATING CIRCUIT FOR FM RECEIVERS

BACKGROUND

The present invention relates in general to identifying signal quality of a received radio transmission, and more specifically to a stop circuit for terminating a scan tuning operation when a transmission is being received having a signal-to-noise ratio greater than a predetermined ratio. The present application is related to U.S. application Ser. No. (88-540) filed concurrently herewith.

The measurement of received signal quality has been employed in FM receivers for implementing a number of different functions. For example, automatic scan tuners which sweep through the FM broadcast band must terminate a scan when a broadcast signal is received having a particular signal quality. Signal quality is also measured in order to modify receiver characteristics in response to certain conditions, e.g., output blanking or reducing stereo separation in response to certain kinds of noise. Signal quality may also be measured in order to display a visual indication of received signal quality to the user of the receiver.

Several different methods have been employed to generate a stop signal for terminating the sweep operation in an automatically scanning tuner. Most methods rely on a quality measure based on the received signal strength, or a frequency window determined by the automatic frequency control (AFC) signal, or a combination of both. Detecting the presence of a received signal strength as being greater than a predetermined magnitude is, by itself, a poor indicator of signal quality. This is because the received signal strength may be high while signal quality is low due to the presence of noise, adjacent channel interference, or multipath interference. The use of a frequency window to ensure that scanning is stopped accurately at the frequency of a strong received signal does not eliminate the possibility of stopping at a received signal including noise and interference.

It is also known to examine the noise component of a signal relative to the information signal component in order to determine signal quality. For example, communications transceivers employ output inhibiting or squelch when a particular level of noise is present. However, the prior art systems measure noise at frequencies that also contain information-related components. Therefore, only noise that is substantially equal to or greater than the information component can be detected.

The measurement of the actual signal-to-noise ratio of a received signal requires complicated and expensive systems which can determine distinct power values for different frequency ranges and generate a ratio of the power values. Simplified systems are known for FM receiver applications which measure the difference in power values in order to identify a signal quality level. For example, Schiebelhuth et al, U.S. Pat. No. 3,889,192, describes a noise suppressing arrangement which determines the absolute levels of the received field strength and the receiver noise. The audio output is enabled only when the field strength is above a predetermined value and the noise is below another predetermined value. Thus, whenever the audio output is enabled, a received signal has at least a minimum signal-to-noise ratio. However, not all signals having that minimum signal-to-noise ratio will be accepted by the system. For example, a signal having a field strength slightly below the predetermined field strength but having substantially no noise would result in the audio output being inhibited. Similarly, a signal having a noise component slightly in excess of the predetermined noise value but having a very large field strength would also not be output by the receiver.

SUMMARY OF THE INVENTION

It is a principal object of the present invention to detect the reception of an FM signal having a predetermined signal quality in a manner which is relatively inexpensive and requires few components.

It is another object of the present invention to provide apparatus and method for indicating the signal-to-noise ratio of a received FM broadcast signal.

It is a further object of the invention to provide for scan tuning of an FM radio wherein a scan operation is stopped only when a signal is received having a signal-to-noise ratio greater than a predetermined signal-to-noise ratio.

These and other objects are achieved by a method and an apparatus for detecting the reception of an FM signal having a predetermined signal quality. The apparatus includes a demodulator means for recovering signal information from the FM signal. An out-of-band filter means is coupled to the demodulator means for isolating a noise signal in a frequency range substantially unaffected by the signal information (e.g., greater than about 150 KHz). Field intensity means are provided for generating a field intensity signal having a magnitude proportional to the field intensity of the FM signal being received. Signal gain means are coupled to the out-of-band filter means and to the field intensity means for amplifying the isolated noise signal by a gain which is a function of the intensity signal to produce an amplified noise signal. Peak detector means are coupled to the signal gain means for comparing the peak value of the amplified noise signal to a predetermined value and for producing a signal to indicate whether an FM signal is being received having the predetermined signal quality. Specifically, the signal gain means includes a gain control such that the gain decreases in response to an increase in the field intensity signal above a predetermined intensity.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION OF PREFERRED EMBODIMENTS

Figure 1:
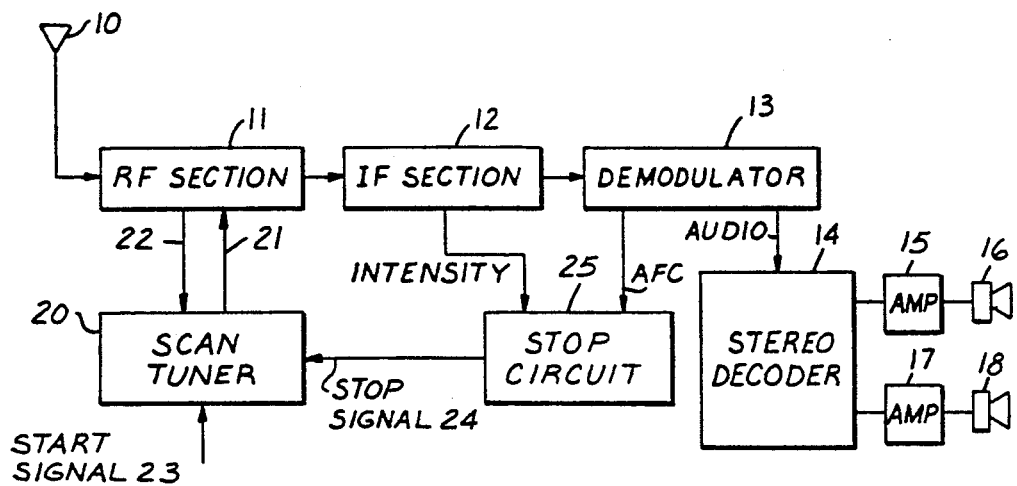
FIG. 1 is a block diagram of a scan tuning FM receiver according to the prior art.

FIG. 1 shows a conventional FM receiver architecture including an antenna 10, an RF section 11, an IF section 12, a demodulator 13, a stereo decoder 14, left and right audio amplifiers 15 and 17, and stereo speakers 16 and 18. Electronic tuning of the FM receiver is accomplished by means of a scan tuner 20 which provides a tuning voltage over a line 21 to RF section 11. A local oscillator contained in RF section 11 provides a local oscillator signal for deriving an intermediate frequency. The local oscillator signal is also provided from RF section 11 to scan tuner 20 over a line 22 for implementing electronic control over the RF tuning using a phase lock loop, for example.

Scan tuning of the FM receiver is implemented by sweeping the tuning voltage provided over line 21 in response to a start signal 23 provided to scan tuner 20. Sweeping of the tuning voltage continues automatically until an FM signal is received meeting the criteria for identifying a signal of a predetermined quality. When such a signal is received, a stop signal 24 is generated by a stop circuit 25 and provided to scan tuner 20. An intensity signal is provided from IF section 12 to stop circuit 25 and an automatic frequency control (AFC) signal is provided from demodulator 13 to stop circuit 25. As taught in the prior art, stop circuit 25 generates a stop signal in response to the intensity signal being above a predetermined intensity and the AFC signal being within a range of voltages defining a frequency window to indicate that the station is accurately tuned in.

The present invention exploits the unique characteristics of received FM signals of varying signal-to-noise ratios in order to improve and simplify the identification of high quality received FM signals.

Figure 2A:
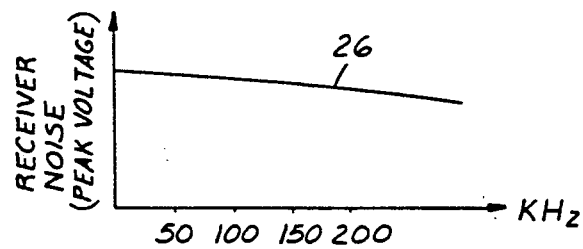
FIGS. 2A, 2B, and 2C plot receiver noise spectrums during reception of no signal, a weak signal, and a strong signal, respectively.

FIG. 2A shows the receiver noise spectrum in an FM receiver when no received signal is being detected. Spectrum 26 demonstrates that receiver noise is nearly constant over a wide frequency range as would be expected for the reception of no broadcasted signal.

Figure 2B:
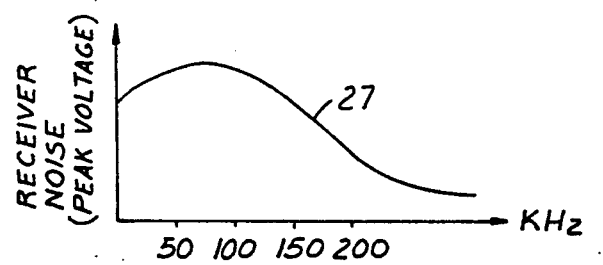

FIG. 2B shows a receiver noise spectrum 27 during reception of a weak signal. Spectrum 27 is shifted toward lower frequencies corresponding to a modulated information signal including a stereo difference channel. Noise voltage falls with increasing frequency in the spectrum.

Figure 2C:
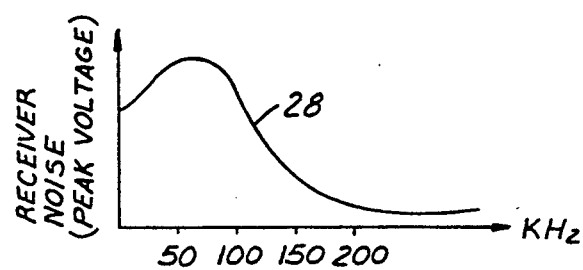

FIG. 2C shows a receiver noise spectrum 28 during reception of a strong station. Spectrum 28 has increased voltage at low frequencies, with voltages at frequencies above about 150 KHz being substantially reduced relative to the lower frequencies.

Figure 3:
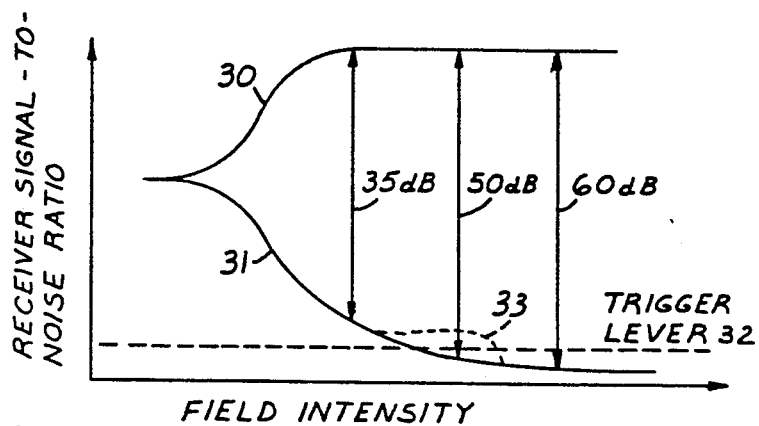
FIG. 3 is a plot of signal-to-noise ratio versus field intensity for the information component and noise component of a received signal of increasing signal quality.

FIG. 3 plots signal-to-noise ratio between the information component and noise component versus increasing field intensity which results as the received signal quality increases. A line 30 shows the peak signal voltage for the information component and line 31 shows the peak signal voltage for the noise component. Thus, as field intensity increases, the separation of lines 30 and 31 increases. This separation corresponds to increasing signal-to-noise ratio, such as 35 dB, 50 dB, and 60 dB.

A trigger level 32 is shown which is used to identify a high quality received signal having a selected signal-to-noise ratio. Using field intensity as a measure of information component peak voltage, the noise component is multiplied by the field intensity to produce an amplified noise signal 33 which indicates signal quality relative to any desired signal-to-noise ratio as determined by the point at which signal 33 crosses trigger level 32. In other words, the noise component line 31 is modified according to the information content or field intensity measure to derive a modified or amplified noise signal 33 which is compared with trigger level 32 in order to identify the predetermined signal quality.

Figure 4:
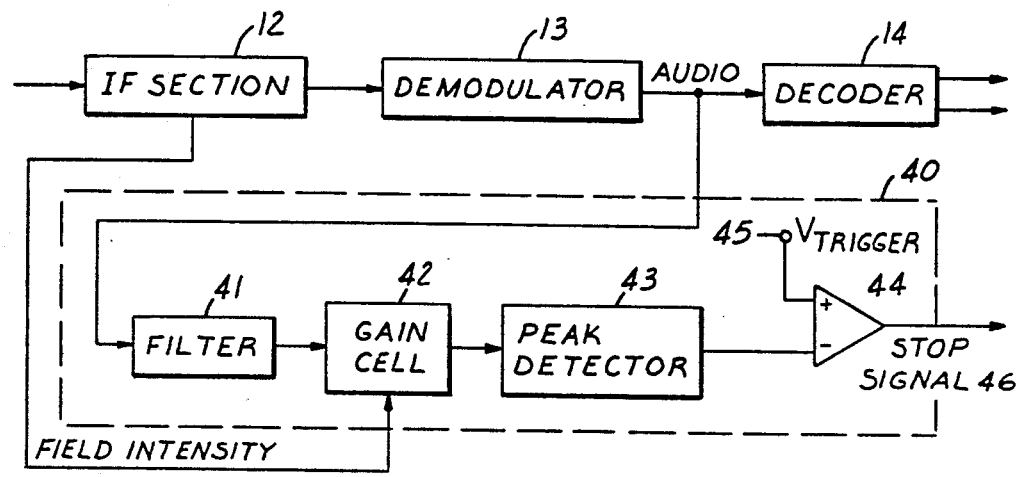
FIG. 4 is a block diagram showing an improved quality indicating circuit of the present invention.

FIG. 4 shows a preferred embodiment of a stop circuit 40 according to the present invention. A filter 41 receives the audio output signal from demodulator 13. Filter 41 blocks the information component and isolates a noise component portion of the audio signal. The noise component is output from filter 41 to a gain cell 42. The field intensity signal from IF section 12 is also provided to gain cell 42. The output of gain cell 42 is coupled to a peak detector 43 having its output connected to the inverting input of a comparator circuit 44. The noninverting input of comparator 44 is connected to a trigger voltage $V_{trigger}$ at a terminal 45. The output of comparator 44 provides a stop signal 46 for terminating a scan operation when an FM signal is received having a signal-to-noise ratio greater than a predetermined ratio.

Gain cell 42 provides a gain amplified noise signal. The gain of gain cell 42 is an inverse function of the field intensity signal such that the gain decreases in response to an increase in the intensity signal. Thus, the peak signal voltage of the noise component is maintained above the trigger level at low field intensities, but is allowed to fall below the trigger level at higher field intensities. The amplified noise signal is converted to a peak value by peak detector 43. The peak value is compared in comparator 44 against trigger voltage $V_{trigger}$ such that the output of comparator 44 swings to a high output value (i.e., generates a stop signal) when the peak value of the amplified noise is below the trigger value. When applied to the scan tuner such as that shown in FIG. 1, the stop signal 46 causes the tuner to stop the scan tuning operation.

Figure 5:
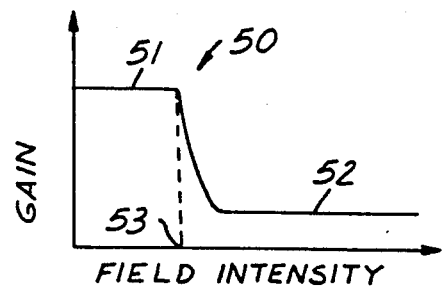
FIG. 5 is a plot showing a preferred gain employed in the present invention as a function of field intensity.

FIG. 5 shows a preferred relationship between the gain applied by gain cell 42 to the noise component versus the field intensity measured by the IF section. Gain function 50 includes a relatively high gain portion 51 and a relatively low gain portion 52 separated by a predetermined intensity 53. Thus, the gain applied to the noise signal is at a high level when the received field intensity is below the predetermined intensity 53.

The point at which line 33 crosses trigger level 32 in FIG. 3 is controlled by the predetermined intensity 53. Thus, by changing the magnitude of predetermined intensity 53, stop signal 46 can be adjusted to identify a signal-to-noise ratio of any predetermined decibel level.

Figure 6:
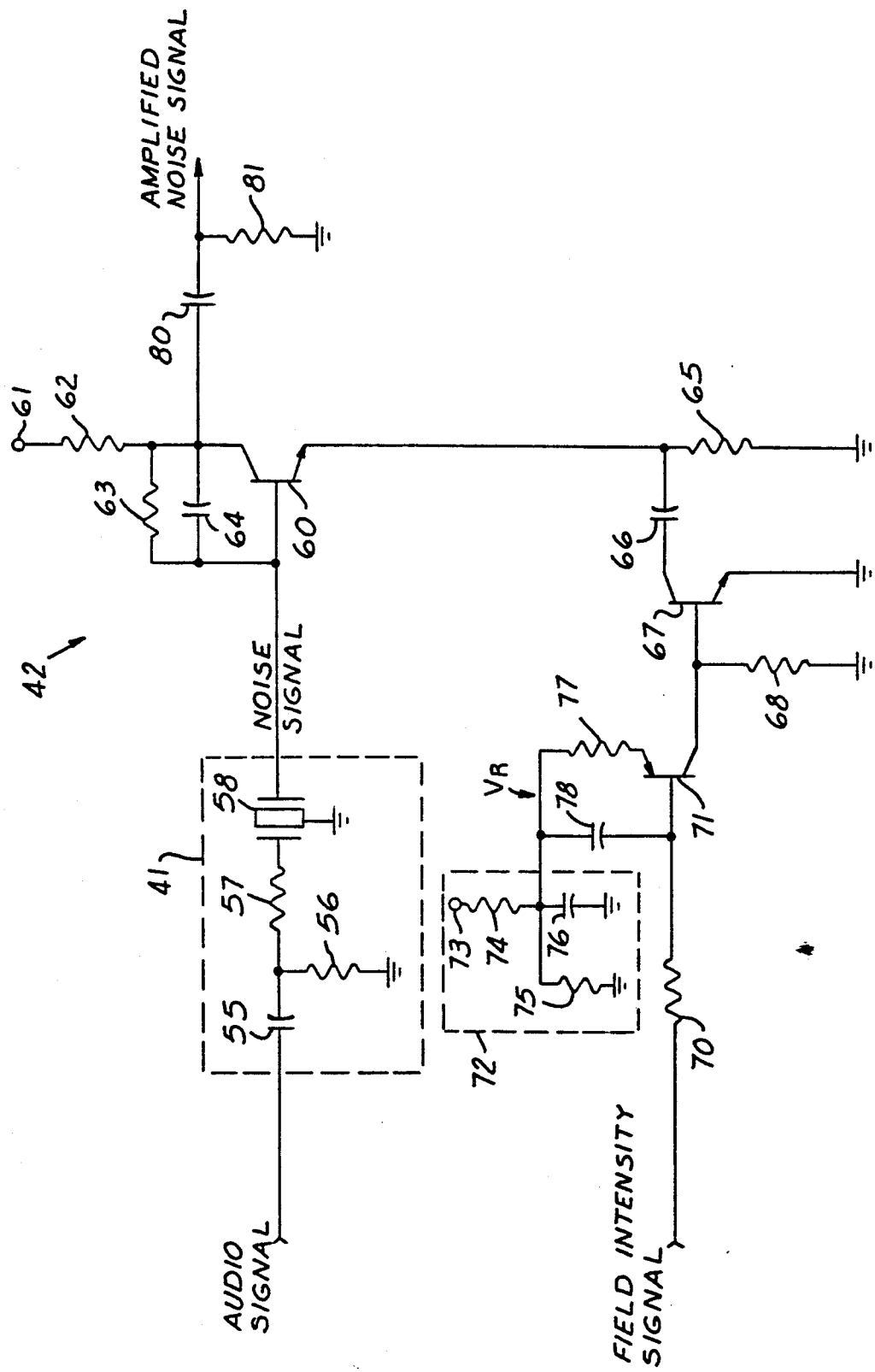
FIG. 6 is a schematic diagram showing the present invention in greater detail.

In FIG. 6, filter 41 and gain cell 42 are shown in greater detail. Filter 41 includes a capacitor 55 connected to receive the audio signal. Capacitor 55 is coupled to ground through a resistor 56 and to a piezoelectric resonator 58 through a resistor 57. The output of piezoelectric crystal 58 is a noise signal as determined by the pass band characteristics of filter 41. In a preferred embodiment, filter 41 provides a narrow passband of about 2 KHz in width having a lower cutoff frequency of about 200 KHz. However, the noise signal can be derived from any frequencies provided that substantially all components of the information signal are filtered out. This could also be achieved by a high pass filter having a lower cutoff frequency in the range of about 150 KHz or higher (i.e., frequencies below about 150 KHz must be blocked).

The noise signal from filter 41 is coupled to gain cell 42 which includes a transistor 60 connected to receive the noise signal at its base. Gain cell 42 also includes components for biasing transistor 60. A resistor 62 is connected between the collector of transistor 60 and a supply voltage at a terminal 61, and a resistor 63 is connected in parallel with a capacitor 64 between the base and the collector of transistor 60. The emitter of transistor 60 is coupled to ground through a resistor 65.

The field intensity signal is coupled through a resistor 70 to the base of a transistor 71. The collector of transistor 71 is connected to the base of transistor 67. The emitter of transistor 71 is coupled to a reference voltage source 72 through a current limiting resistor 77.

Reference voltage source 72 includes a supply voltage terminal 73, a pair of voltage dividing resistors 74 and 75 connected in series between terminal 73 and ground, and a capacitor 76 connected between the junction of resistors 74 and 75 and ground. Reference voltage source 72 provides a reference voltage $V_R$. A capacitor 78 is connected between $V_R$ and the base of transistor 71.

A capacitor 66 has one end connected to the junction between the emitter of transistor 60 and resistor 65 and has its other end connected to the collector of a transistor 67. The emitter of transistor 67 is connected to ground and the base of transistor 67 is coupled to ground through a resistor 68.

The collector output of transistor 60 is connected to one side of a capacitor 80. The other side of capacitor 80 is coupled to ground through a resistor 81 and provides the amplified noise signal to peak detector 43.

In operation, the noise signal isolated by filter 41 is amplified by transistor 60 and is passed through coupling capacitor 80 to provide the amplified noise signal. The gain of transistor 60 is controlled by its effective emitter resistance. This resistance is in turn controlled by transistor 67. When transistor 67 is biased into conduction, the emitter of transistor 60 is effectively grounded to AC signals through capacitor 66. The resulting gain of transistor 60 is at a relatively high level due to the low effective emitter resistance of transistor 60. When transistor 67 is biased to its nonconducting state, the effective emitter resistance seen by transistor 60 increases to the resistance of resistor 65, thereby lowering the gain applied to the noise signal.

The conduction of transistor 67 is controlled by transistor 71 which is in turn controlled by the field intensity signal and the reference voltage $V_R$. When transistor 71 is biased to its nonconducting state, the base of transistor 67 is grounded through resistor 68. When transistor 71 is biased into conduction, base current for transistor 67 is supplied by the collector of transistor 71.

Transistor 71 is a PNP transistor. Therefore, it is turned on when its emitter voltage is greater than its base voltage by a threshold voltage which is characteristic of the PNP transistor. This threshold voltage is typically about 0.6 volts. Thus, transistor 71 is in conduction as long as the field intensity signal provided through resistor 70 has a DC voltage less than voltage reference $V_R$ minus 0.6 volts. To compensate for that difference, $V_R$ is set to be about 0.6 volts above the desired trigger level.

By controlling reference voltage $V_R$, the point at which the amplified noise signal crosses the trigger level can be set at a desired signal-to-noise ratio. For purposes of providing a stop circuit for a scan tuner, the desired signal-to-noise ratio can be set at a fixed level, such as about 30 dB. It is also possible to vary reference voltage $V_R$ prior to a scan operation in order to scan for local or distant broadcast stations, for example. Such variable reference voltages could be provided under control of a microprocessor and a digital-to-analog converter, for example. Alternatively, the present invention could be used to indicate the presence of a signal having a predetermined signal-to-noise ratio, or a plurality of circuits could be employed to graphically display the received signal-to-noise ratio.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. Apparatus for detecting the reception of an FM signal having a predetermined signal quality, said apparatus comprising:
   demodulator means for recovering signal information from said FM signal;
   out-of-band filter means coupled to said demodulator means for isolating a noise signal in a frequency range substantially unaffected by said signal information;
   field intensity means for generating a field intensity signal having a magnitude proportional to the field intensity of said FM signal being received;
   signal gain means coupled to said out-of-band filter means and to said field intensity means for amplifying said isolated noise signal by a gain which is a function of said intensity signal to produce an amplified noise signal; and
   peak detector means coupled to said signal gain means for comparing the peak value of said amplified noise signal to a predetermined value and for producing a signal to indicate whether an FM signal is being received having said predetermined signal quality.

2. The apparatus of claim 1 wherein said out-of-band filter means is comprised of a filter having a lower cutoff frequency in the range of about 150 kilohertz and higher.

3. The apparatus of claim 2 wherein said lower cutoff frequency is about 200 kilohertz.

4. The apparatus of claim 1 wherein said out-of-band filter means is comprised of a passband filter having a lower cutoff frequency in the range of about 150 kilohertz and higher.

5. The apparatus of claim 4 wherein said passband filter has a passband of about 2 kilohertz and wherein said lower cutoff frequency is about 200 kilohertz.

6. The apparatus of claim 1 wherein said signal gain means includes a gain control such that said gain decreases in response to an increase in said field intensity signal above a predetermined intensity.

7. The apparatus of claim 6 wherein said gain control includes a trigger switch for setting said predetermined intensity and switching said signal gain means between a high gain and a low gain.

8. An FM radio receiver for receiving broadcast signals in the FM band, said receiver comprising:
   tuner means for tuning to a portion of said FM band;

scan tuning means coupled to said tuner means for scan tuning said receiver in response to a scan signal and for stopping said scan tuning in response to a stop signal;

demodulator means coupled to said tuner means for recovering audio signal information from said FM signal;

out-of-band filter means coupled to said demodulator means for isolating a noise signal in a frequency range substantially unaffected by said audio signal information;

field intensity means coupled to said tuner means for generating a field intensity signal having a magnitude proportional to the field intensity at which said FM signal is being received;

signal gain means coupled to said out-of-band filter means and to said field intensity means for amplifying said noise signal by a gain which is a function of said field intensity signal to produce an amplified noise signal; and peak detector means coupled to said signal gain means and to said scan tuning means for comparing the peak value of said amplified noise signal to a predetermined value and for producing said stop signal when said peak value is below said predetermined value to indicate that an FM signal is being received having a predetermined signal quality.

9. The receiver of claim 8 wherein said out-of-band filter means is comprised of a filter having a lower cut-off frequency in the range of about 150 kilohertz and higher.

10. The receiver of claim 9 wherein said lower cutoff frequency is about 200 kilohertz.

11. The receiver of claim 8 wherein said out-of-band filter means is comprised of a passband filter having a lower cutoff frequency in the range of about 150 kilohertz and higher.

12. The receiver of claim 11 wherein said passband filter has a passband of about 2 kilohertz and wherein said lower cutoff frequency is about 200 kilohertz.

13. The receiver of claim 8 wherein said signal gain means includes a gain control such that said gain decreases in response to an increase in said intensity signal above a predetermined intensity.

14. The receiver of claim 13 wherein said gain control includes a trigger switch for setting said predetermined intensity and switching said signal gain means between a high gain and a low gain.

15. A method for determining if a received FM signal has a predetermined signal quality, comprising the steps of:

demodulating said FM signal to provide an audio output signal;

isolating a noise signal from said audio output signal, said noise signal having a frequency range with substantially no frequency components below 150 kilohertz;

generating a field intensity signal proportional to the received signal strength of said FM signal;

amplifying said noise signal according to a gain which is a function of said field intensity signal;

peak detecting the amplified noise signal to generate a peak level signal proportional to the peak of said amplified noise signal; and comparing said peak level signal to a predetermined level signal to indicate whether said received FM signal is above or below said predetermined signal quality.

16. The method of claim 15 wherein said gain has a high gain level and a low gain level, said method further comprising the step of:

comparing said field intensity signal to a predetermined intensity signal, said high gain level being used in said amplifying step when said field intensity signal is below said predetermined intensity signal, and said low gain level being used in said amplifying step when said field intensity signal is above said predetermined intensity signal.

17. The method of claim 16 further comprising the step of:

setting the magnitude of said predetermined intensity signal to control the criterion for said predetermined signal quality.

18. A method for scan tuning an FM radio receiver to a received signal having a predetermined signal quality, said method comprising the steps of:

initiating a frequency scan within an FM band to receive an FM signal;

demodulating said FM signal to provide an audio output signal;

isolating a noise signal from said audio output signal, said noise signal having a frequency range with substantially no frequency components below 150 kilohertz;

generating a field intensity signal proportional to the received signal strength of said FM signal;

amplifying said noise signal according to a gain which is a function of said field intensity signal;

peak detecting the amplified noise signal to generate a peak level signal proportional to the peak of said amplified noise signal;

comparing said peak level signal to a predetermined level signal; and stopping said frequency scan if said peak level signal is below said predetermined level signal.

19. The method of claim 18 wherein said gain has a high gain level and a low gain level, said method further comprising the step of:

comparing said field intensity signal to a predetermined intensity signal, said high gain level being used in said amplifying step when said field intensity signal is below said predetermined intensity signal, and said low gain level being used in said amplifying step when said field intensity signal is above said predetermined intensity signal.

20. The method of claim 19 further comprising the step of:

setting the magnitude of said predetermined intensity signal to control the criterion for said predetermined signal quality.

* * * * *